US011314461B2

(12) United States Patent
Cho (10) Patent No.: US 11,314,461 B2
(45) Date of Patent: Apr. 26, 2022

(54) DATA STORAGE DEVICE AND OPERATING METHOD OF CHECKING SUCCESS OF GARBAGE COLLECTION OPERATION

(71) Applicant: SK hynix Inc., Gyeonggi-do (KR)

(72) Inventor: Dae Gon Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 79 days.

(21) Appl. No.: 16/658,386

(22) Filed: Oct. 21, 2019

(65) Prior Publication Data
US 2021/0004325 A1 Jan. 7, 2021

(30) Foreign Application Priority Data
Jul. 5, 2019 (KR) .................. 10-2019-0081297

(51) Int. Cl.
*G06F 3/06* (2006.01)
(52) U.S. Cl.
CPC .......... *G06F 3/0679* (2013.01); *G06F 3/0617* (2013.01); *G06F 3/0653* (2013.01); *G06F 2212/7205* (2013.01)
(58) Field of Classification Search
CPC .......... G06F 3/0653; G06F 2212/7205; G06F 3/0679; G06F 3/0617
See application file for complete search history.

(56) References Cited

U.S. PATENT DOCUMENTS

| 2013/0019057 | A1* | 1/2013 | Stephens | G06F 3/0638 711/103 |
| 2015/0347295 | A1* | 12/2015 | Ihm | G06F 12/0246 711/103 |
| 2019/0114258 | A1* | 4/2019 | Tsuchiyama | G06F 3/0652 |
| 2019/0155725 | A9* | 5/2019 | Choi | G06F 3/0652 |

FOREIGN PATENT DOCUMENTS

KR  1020170071085  6/2017

* cited by examiner

*Primary Examiner* — Chie Yew
(74) *Attorney, Agent, or Firm* — IP & T Group LLP (57) ABSTRACT

A data storage device may include a memory device including a plurality of memory blocks having a plurality of free memory blocks and a controller configured to control an operation of the memory device, wherein the controller performs a block allocation operation of allocating one or more free memory blocks among the plurality of free memory blocks as one or more programmable memory blocks, and performs a garbage collection (GC) error defense operation of checking whether a GC operation for the plurality of memory blocks has performed successfully, in response to the block allocation operation.

17 Claims, 9 Drawing Sheets

FTL

DATA STORAGE DEVICE AND OPERATING METHOD OF CHECKING SUCCESS OF GARBAGE COLLECTION OPERATION

CROSS-REFERENCES TO RELATED APPLICATION

The present application claims priority under 35 U.S.C. § 119(a) to Korean application number 10-2019-0081297, filed on Jul. 5, 2019, which is incorporated herein by reference in its entirety.

BACKGROUND

1. Technical Field

Various embodiments generally relate to an electronic device, and more particularly, to a data storage device and an operating method thereof.

2. Related Art

Recently, the paradigm for the computing environment has changed to a ubiquitous computing environment in which computer systems can be used anytime and anywhere. Therefore, the use of portable electronic devices such as mobile phones, digital cameras and notebook computers has rapidly increased. Such portable electronic devices generally employ a data storage device using a memory device for storing data used in the portable electronic devices.

Since a data storage device using a memory device has no mechanical driver, the data storage device has excellent stability and durability, high information access speed, and low power consumption. Data storage devices having such advantages include a universal serial bus (USB) memory device, a memory card having various interfaces, a universal flash storage (UFS) device, and a solid-state drive (SSD).

SUMMARY

Various embodiments are directed to a data storage device capable of constantly retaining free blocks, and an operating method thereof.

In an embodiment, a data storage device may include: a memory device including a plurality of memory blocks having a plurality of free memory blocks; and a controller configured to control an operation of the memory device, wherein the controller performs a block allocation operation of allocating one or more free memory blocks among the plurality of free memory blocks as one or more programmable memory blocks, and performs a garbage collection (GC) error defense operation of checking whether a GC operation for the plurality of memory blocks has performed successfully, in response to the block allocation operation.

In an embodiment, there is provided an operating method of a data storage device which includes a controller and a memory device including a plurality of memory blocks having a plurality of free memory blocks. The operating method may include: allocating one or more free memory blocks among the plurality of free memory blocks as one or more programmable memory blocks; and performing a garbage collection (GC) error defense operation for checking whether a GC operation for the plurality of memory blocks has performed successfully.

In an embodiment, a data storage device may include: a memory device including a plurality of memory blocks; and a controller suitable for: determining whether the number of free blocks among the plurality of memory blocks is less than a threshold number; when it is determined that the number of free blocks among the plurality of memory blocks is less than the threshold number, determining whether a garbage collection (GC) has performed successfully, based on a maximum number of programmable memory blocks among the plurality of memory blocks and a garbage collection (GC) count; and when it is determined that the garbage collection has not performed successfully, waiting in an operation suspended state until a reset operation is performed by a host.

DETAILED DESCRIPTION

Hereinafter, a data storage device and an operating method thereof according to the present disclosure will be described below with reference to the accompanying drawings through various embodiments.

Figure 1:
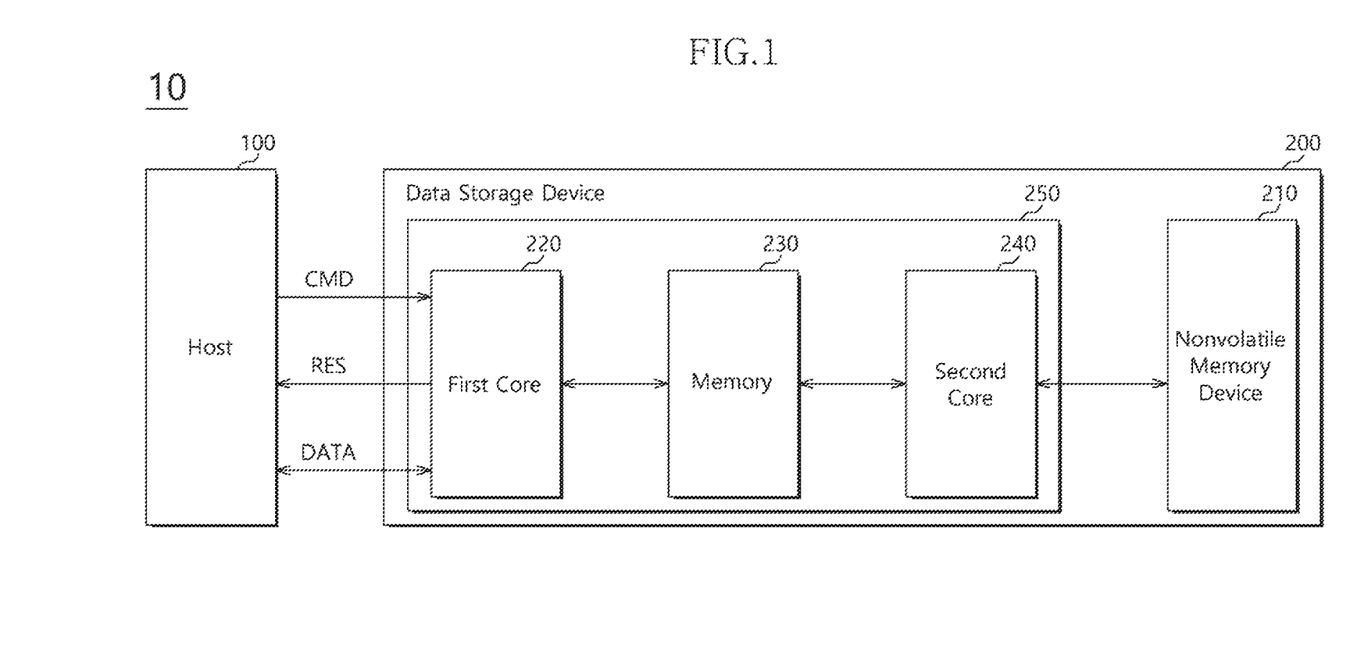
FIG. 1 is a diagram illustrating a data processing system including a data storage device coupled to a host in accordance with an embodiment.

FIG. 1 is a diagram illustrating a data processing system 10 including a data storage device 200 in accordance with an embodiment.

Referring to FIG. 1, the data processing system 10 may include a host 100 and a data storage device 200. The host 100 may transfer a command CMD to the data storage device 200. The data storage device 200 may perform an operation corresponding to the command CMD received from the host 100, and transfer a response RES including a performance result to the host 100. The host 100 and the data storage device 200 may transfer and receive data DATA.

The host 100 may include a mobile phone, an MP3 player, a laptop computer, a desktop computer, a game machine, a television (TV), and an in-vehicle infotainment system, however the present embodiment is not limited thereto.

The data storage device 200 may store data accessed by the host 100. The data storage device 200 may be fabricated as one of various types of storage devices, depending on an interface protocol coupled to the host. For example, the data storage device 200 may be configured as one of various types of storage devices which include a solid state drive (SSD), a multi-media card (MMC) such as an eMMC, RS-MMC or micro-MMC, a secure digital (SD) card such as a mini-SD or micro-SD, a universal storage bus (USB) storage device, a universal flash storage (UFS) device, a personal computer memory card international association (PCMCIA) card-type storage device, a peripheral component interconnection (PCI) card-type storage device, a PCI Express (PCI-e or PCIe) card-type storage device, a compact flash (CF) card, a smart media card and a memory stick.

The data storage device 200 may be fabricated as one of various types of packages. For example, the data storage device 200 may be fabricated as one of various types of packages such as package-on-package (POP), system-in-package (SIP), system-on-chip (SOC), multi-chip package (MCP), chip-on-board (COB), wafer-level fabricated package (WFP) and wafer-level stack package (WSP).

The data storage device 200 may include a nonvolatile memory device 210 and a controller 250.

The nonvolatile memory device 210 may operate as a storage medium of the data storage device 200. The nonvolatile memory device 210 may be configured as one of various types of nonvolatile memory devices such as a NAND flash memory device, NOR flash memory device, ferroelectric random access memory (FRAM) using a ferroelectric capacitor, magnetic random access memory (MRAM) using a tunneling magneto-resistive (TMR) layer, phase change random access memory (PRAM) using chalcogenide alloys, and resistive random access memory (ReRAM) using transition metal oxide, depending on memory cells.

For simplification, FIG. 1 illustrates the nonvolatile memory device 210 as one block, but the nonvolatile memory device 210 may include a plurality of memory chips. The present embodiment may be applied in the same manner to a data storage device 200 including the nonvolatile memory device 210 constituted by the plurality of memory chips.

The nonvolatile memory device 210 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each memory cell of the memory cell array may be configured as a single level cell (SLC) for storing 1-bit data therein, a multi-level cell (MLC) for storing 2-bit data therein, a triple level cell (TLC) for storing 3-bit data therein, or a quadruple level cell (QLC) for storing 4-bit data therein. The memory cell array may include one or more of the SLC, the MLC, the TLC and the QLC. For example, the memory cell array may include memory cells with a two-dimensional horizontal structure or memory cells with a three-dimensional vertical structure.

The controller 250 may control overall operations of the data storage device 200. The controller 250 may process a command CMD received from the host 100. The controller 250 may generate control signals for controlling an operation of the nonvolatile memory device 210 based on the command CMD received from the host 100, and provide the generated control signals to the nonvolatile memory device 210. The controller 250 may include a first core 220, a memory 230, and a second core 240.

The first core 220 may be configured to interface the host 100 and the data storage device 200 in response to a protocol of the host 100. Therefore, the first core 220 may be referred to as a protocol core. For example, the first core 220 may communicate with the host 100 through any one protocol of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-e or PCIe).

The first core 220 may include a micro control unit (MCU) and/or a central processing unit (CPU). The first core 220 may receive commands CMD from the host 100, and provide the received commands CMD to the second core 240.

The first core 220 may store data (for example, write data) received from the host 100 in a write buffer of the memory 230. For this operation, the controller 250 may further include a data transfer block (not illustrated) for transferring the write data received from the host 100 to the write buffer of the memory 230. For example, the data transfer block may be configured to store the write data received from the host 100 in the write buffer of the memory 230 according to a control signal received from the first core 220.

The first core 220 may transfer data stored in a read buffer of the memory 230 (for example, read data) to the host 100 using the data transfer block. For example, the data transfer block may transfer the read data stored in the read buffer of the memory 230 to the host 100 according to a control signal received from the first core 220.

In an embodiment, the first core 220 may generate a descriptor based on the command CMD received from the host 100, and provide the generated descriptor to the second core 240. The descriptor may indicate a statement of work, including information required for the second core 240 to process the command CMD.

The memory 230 may be configured as a random-access memory (RAM) such as a static RAM (SRAM), but is not limited thereto. The memory 230 may be physically and electrically coupled to the first and second cores 220 and 240. The memory 230 may store software driven by the second core 240, i.e., firmware. Furthermore, the memory 230 may store data required for driving the firmware, for example, metadata. That is, the memory 230 may operate as a working memory of the second core 240.

The memory 230 may include a write buffer for temporarily storing write data to be transferred to the nonvolatile memory device 210 from the host 100 and a read buffer for temporarily storing read data to be transferred to the host 100 from the nonvolatile memory device 210. That is, the memory 230 may operate as a buffer memory. The internal configuration of the memory 230 will be described in detail with reference to FIG. 2.

The second core 240 may control overall operations of the data storage device 200 by executing the firmware loaded to the memory 230. The second core 240 may decode and execute a code-based instruction or algorithm such as firmware or software. Therefore, the second core 240 may also be referred to as a flash translation layer (FTL) core. The second core 240 may include a micro control unit (MCU) and/or a central processing unit (CPU).

The second core 240 may generate control signals for controlling an operation of the nonvolatile memory device 210 based on a command provided from the first core 220, and provide the generated control signals to the nonvolatile memory device 210. The control signals may include a command, an address, and an operation control signal for controlling the nonvolatile memory device 210. The second core 240 may provide write data to the nonvolatile memory device 210, or receive read data from the nonvolatile memory device 210.

The second core 240 may include an error correction code (ECC) circuit (not illustrated). The ECC circuit is configured to perform an ECC encoding operation of generating parity data by ECC-encoding write data provided from the host 100 and an ECC decoding operation of detecting and correcting an error contained in data read from the nonvolatile memory device 210 using the parity data.

Figure 2:
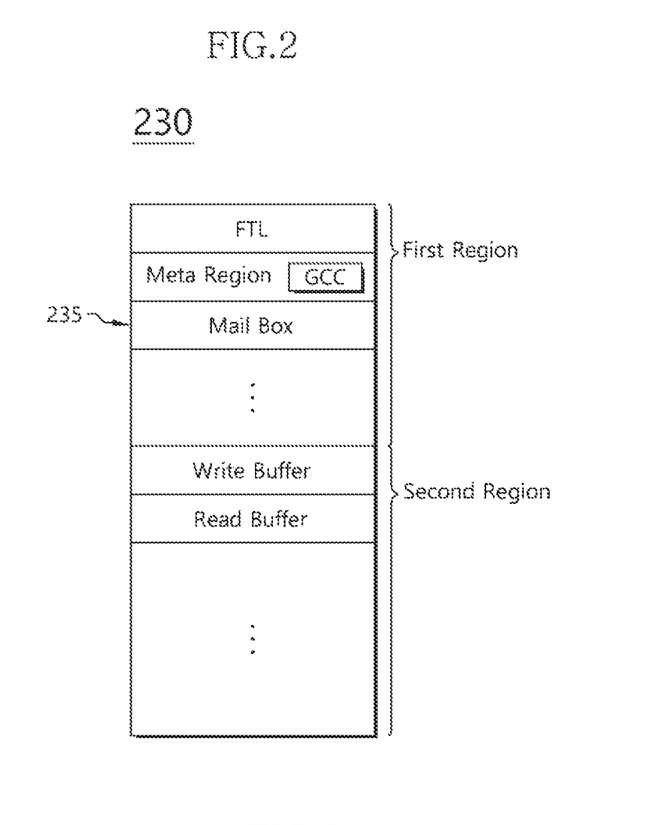
FIG. 2 is a diagram illustrating a memory of FIG. 1.
Figure 3:
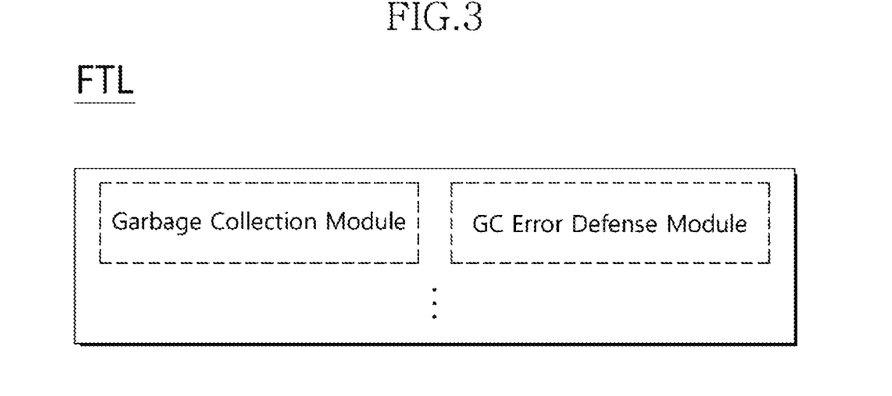
FIG. 3 is a diagram illustrating a flash translation layer (FTL).
Figure 4:
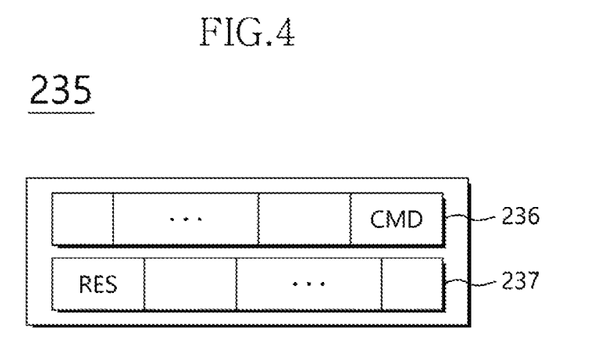
FIG. 4 is a diagram illustrating a mail box of FIG. 2.

FIG. 2 illustrates the memory 230 of FIG. 1. FIG. 3 illustrates a flash translation layer (FTL). FIG. 4 illustrates a mail box of FIG. 2.

Referring to FIG. 2, the memory 230 may be divided into first and second regions, but is not specifically limited thereto. For example, the first region of the memory 230 may store firmware analyzed and executed by the second core 240 and metadata required for the second core 240 to perform a computing and processing operation. The second region of the memory 230 may include buffers for temporarily storing write data, and read data, but is not specifically limited thereto.

A distance between the first region of the memory 230 and each of the first and second cores 220 and 240 may be less than a distance between the second region of the memory 230 and each of the first and second cores 220 and 240, but the present embodiment is not specifically limited thereto. Since the first region of the memory 230 is located at a position which is physically close to the first and second cores 220 and 240, the first and second cores 220 and 240 may quickly access necessary data.

For example, the first region of the memory 230 may store an FTL. The FTL may indicate software executed by the second core 240, and the second core 240 may execute the FTL to control an operation of the nonvolatile memory device 210, and to provide device compatibility to the host 100. As the FTL is executed, the data storage device 200 may be recognized and used as a general data storage device such as a hard disk by the host 100.

The FTL may include modules for performing various functions. Referring to FIG. 3, the FTL may include a garbage collection module GCM and a garbage collection error defense module GCEDM, however the FTL is not specifically limited thereto. For example, the FTL may further include a read module, a write module, a wear-levelling module, a bad block management module, and a map module.

The FTL may be stored in a system region (not illustrated) of the nonvolatile memory device 210. When the data storage device 200 is powered on, the FTL may be read from the system region of the nonvolatile memory device 210 and loaded to the first region of the memory 230. The FTL loaded to the first region of the memory 230 may be loaded to a memory (not illustrated) which is dedicated to the second core 240 and separately provided inside or outside the second core 240.

The first region of the memory 230 may include a meta region for storing metadata required for executing various modules in the FTL. In the present embodiment, a garbage collection count (GCC) indicating the number of times that GC source blocks are erased by a GC operation may be stored in the meta region. The GCC may correspond to the number of memory blocks erased by the GC operation.

The first region of the memory 230 may include a mail box 235 for queuing commands and responses which are transferred between the first and second cores 220 and 240. Referring to FIG. 4, the mail box 235 may include a command queue 236 for queuing commands transferred from the first core 220 to the second core 240 and a response queue 237 for queuing responses transferred from the second core 240 to the first core 220, however the internal configuration of the mail box 235 is not specifically limited thereto.

The second region of the memory 230 may include a write buffer, and a read buffer.

The write buffer may be configured to temporarily store write data to be transferred to the nonvolatile memory device 210 from the host 100. The read buffer may be configured to temporarily store read data which is read from the nonvolatile memory device 210 and will be transferred to the host 100.

As described above, the second core 240 may execute the modules in the FTL in order to perform various functions.

In the present embodiment, when one or more free blocks among free blocks in the nonvolatile memory device 210 are allocated as one or more open blocks, the second core 240 may execute the GCEDM of FIG. 3 to perform a GC error defense operation. The GC error defense operation may indicate an operation of checking whether the GCM is normally executed. For example, the GC error defense operation may indicate an operation of checking whether the GCM normally performs a GC operation without a code error or a software error.

The free block indicates a usable block, i.e., an available block. For example, the free block may be used as the term that includes a block having only pages which are not programmed, a block having only invalid pages in which invalid data are stored, and a block having only erased pages from which data are erased. The open block indicates a block allocated to store (or write or program) data. That is, the open block may be understood as a programmable block.

In general, the GCM is executed according to the number of free blocks in the nonvolatile memory device 210. For a normal operation of the data storage device 200, the nonvolatile memory device 210 needs to have a predetermined number of free blocks or more at all times. When the number of free blocks in the nonvolatile memory device 210 is less than the predetermined number, the second core 240 may execute the GCM to generate a free block. For example, the GCM may perform a GC operation of selecting a GC source block among closed blocks, moving valid data within the selected GC source block to another block, and then generating a free block by erasing the GC source block. The closed block indicates a block which is completely used, i.e., a block in which all pages have data stored therein. The closed block may include both valid data and invalid data.

When the GCM is normally executed without an error, the nonvolatile memory device 210 may retain the predetermined number of free blocks or more at all times. However, when the GCM is not normally executed, a new free block may not be generated. Thus, a fail of the data storage device 200 may occur due to a shortage of free blocks.

Therefore, in the present embodiment, the controller 250 periodically checks whether the GCM is normally executed without an error. Specifically, when allocating a new open block because a previously allocated open block is completely used, the controller 250 executes the GCEDM to check whether the GCM is normally executed.

For example, the second core 240 may execute the GCEDM to perform a GC error defense operation, while allocating a new open block. The GC error defense operation will be described in detail as follows.

First, the second core 240 checks whether the number of free blocks in the nonvolatile memory device 210 is less than a preset threshold number. At this time, the threshold number may be equal to or different from the above-described predetermined number, i.e., the number of free blocks which the nonvolatile memory device 210 needs to retain. When the number of free blocks is less than the threshold number, the second core 240 checks whether a first reference value is a value of '0' at the moment. The first reference value may indicate the maximum number of open blocks which can be allocated at the same time.

When the first reference value is a value of '0' at the moment, the second core 240 checks whether a second reference value indicating the GCC is a value of '0' at the moment. When the second reference value is a value of '0' at the moment, the second core 240 may determine that the GCM is not normally executed, and waits in an operation suspended state until a reset operation is performed by the host 100. At this time, the second core 240 may store error information in the nonvolatile memory device 210. The error information may indicate that the GCM is not normally executed.

When the number of free blocks is greater than or equal to the threshold number, the second core 240 may reset the first and second reference values stored in the memory 230, and then control the nonvolatile memory device 210 to perform an operation corresponding to the command received from the host 100.

When the first reference value is not a value of '0', the second core 240 may not check whether the second reference value is a value of '0', but decrease the first reference value by a value of '1' regardless of the second reference value, and then control the nonvolatile memory device 210 to perform the operation corresponding to the command received from the host 100. Furthermore, when the second reference value is not a value of '0', the second core 240 may determine that the GCM is normally executed, reset the first and second reference values stored in the memory 230, and then control the nonvolatile memory device 210 to perform the operation corresponding to the command received from the host 100.

In the present embodiment, the reason to set the first reference value to the maximum number of open blocks which can be allocated at the same time is that, when the GCM is normally operated, one or more GC operations are necessarily performed before allocated open blocks are all used. In the present embodiment, when open blocks are referred to as being allocated at the same time, it does not indicate that the open blocks are necessarily allocated at the same point of time.

Figure 5:
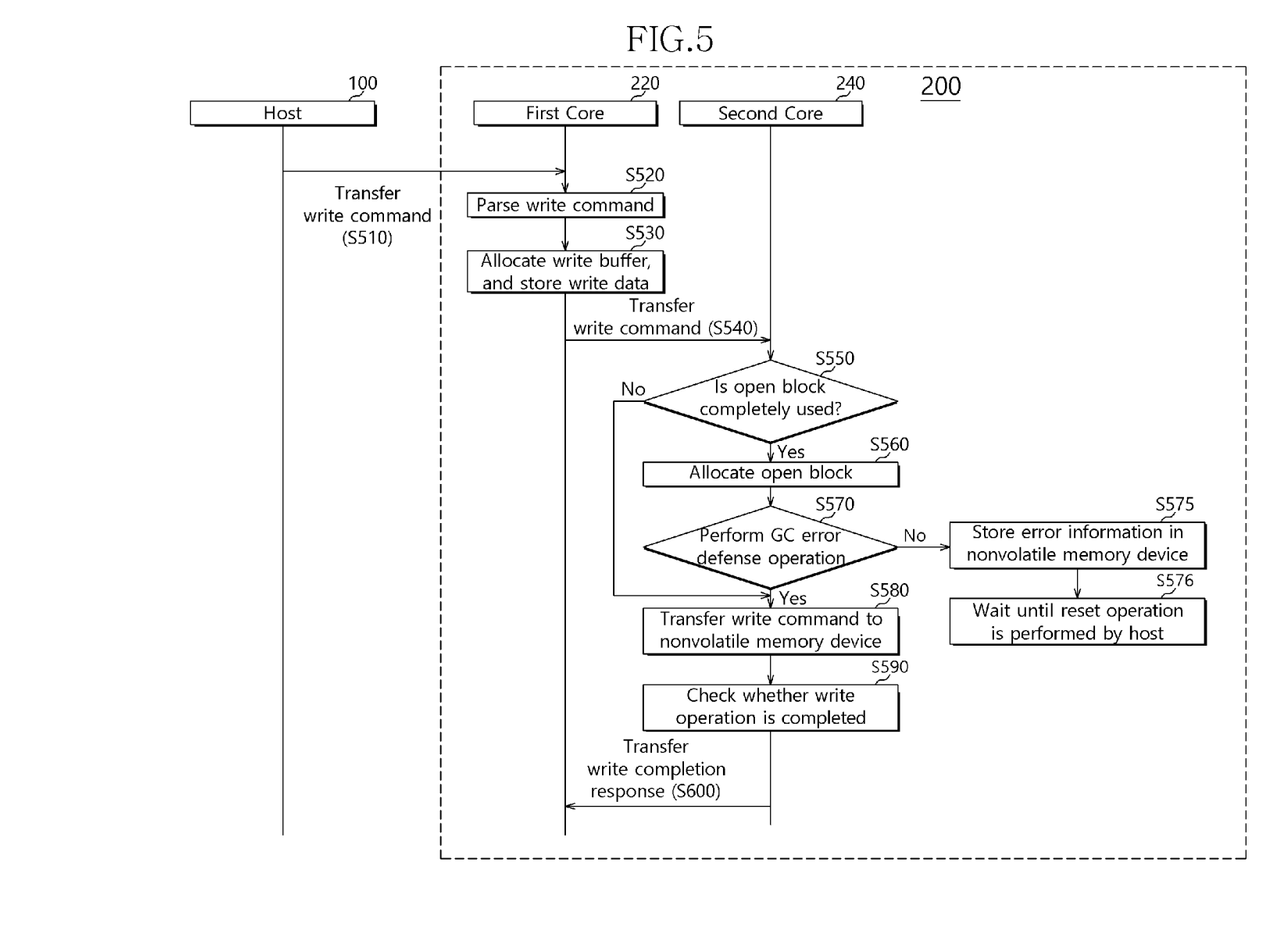
FIG. 5 is a flowchart illustrating an operating method of a data storage device in accordance with an embodiment.

FIG. 5 is a flowchart illustrating an operating method of the data storage device 200 in accordance with an embodiment. When the operating method of the data storage device 200 is described with reference to FIG. 5, one or more of FIGS. 1 to 4 may be referred to. For convenience, the present embodiment is based on the command which the host 100 transfers to the data storage device 200 is a write command.

Referring to FIG. 5, in step S510, the host 100 may transfer a write command to the first core 220 of the data storage device 200.

In step S520, the first core 220 may parse the write command received from the host 100.

In step S530, the first core 220 may set a data size based on the write command, and allocate a write buffer of the memory 230. The first core 220 may store write data in the allocated write buffer.

In step S540, the first core 220 may transfer the write command to the second core 240. For example, the first core 220 may queue the write command into the command queue 236 of the mail box 235 of the memory 230, in order to transfer the write command to the second core 240.

In step S550, the second core 240 may determine whether a previously allocated open block is completely used, in response to the write command received from the first core 220. When it is determined that the previously allocated open block is completely used (S550, Yes), the process may proceed to step S560. When it is determined that the previously allocated open block is not completely used (S550, No), the process may proceed to step S580.

In step S560, the second core 240 may newly allocate one or more free blocks among the free blocks of the nonvolatile memory device 210 as one or more open blocks.

In step S570, the second core 240 may execute the GCEDM to perform a GC error defense operation. Depending on the performance result of the GC error defense operation, the process may proceed to step S575 or S580. For example, when the performance result of the GC error defense operation indicates that the GCM is not normally executed (S570, No), the process may proceed to step S575. On the other hand, when the performance result indicates that the GCM has executed normally (S570, Yes), the process may proceed to step S580. The GC error defense operation will be described below in detail with reference to FIG. 6.

In step S575, the second core 240 may store error information in the nonvolatile memory device 210. The error information may indicate that the GCM has not executed normally.

In step S576, the second core 240 may wait in an operation suspended state, until a reset operation is performed by the host 100.

In step S580, the second core 240 may transfer the write command and the write data, which are received from the host 100, to the nonvolatile memory device 210.

In step S590, the second core 240 may check whether a write operation is completed in the nonvolatile memory device 210.

In step S600, the second core 240 may transfer a response to the first core 220. The response may indicate that the write operation is completed. For example, the second core 240 may queue the response into the response queue 237 of the mail box 235 of the memory 230, in order to transfer the response to the second core 240.

Figure 6:
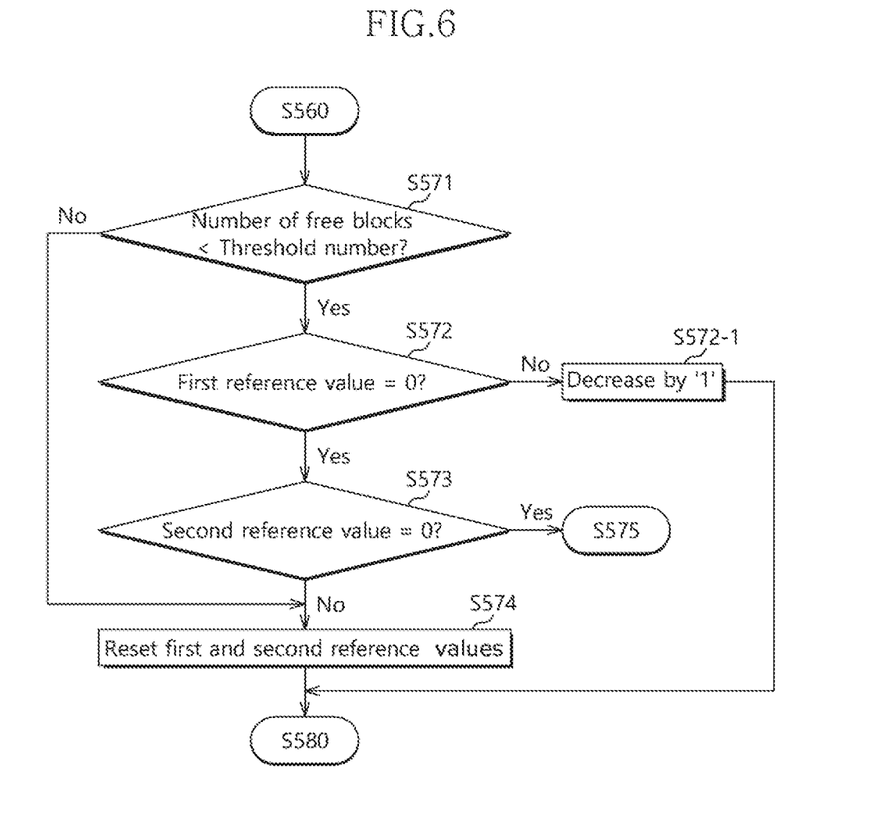
FIG. 6 is a flowchart illustrating step S570 of FIG. 5 in detail.

FIG. 6 is a flowchart illustrating step S570 of FIG. 5 in detail.

Referring to FIG. 6, in step S571, the second core 240 may determine whether the number of free blocks in the nonvolatile memory device 210 is less than a preset threshold number. When it is determined that the number of free blocks is less than the threshold number (S571, Yes), the process may proceed to step S572. On the other hand, when it is determined that the number of free blocks is greater than or equal to the threshold number (S571, No), the process may proceed to step S574.

In step S572, the second core 240 may check whether the first reference value is a value of '0' at the moment. The first reference value may be initially set to the maximum number of open blocks which can be allocated in the nonvolatile memory device 210 at the same time. The first reference value may be stored in the memory 230. When it is checked that the first reference value is a value of '0' at the moment (S572, Yes), the process may proceed to step S573. On the other hand, when it is checked that the first reference value is not a value of '0' at the moment (S572, No), the process may proceed to step S572-1. In step S572-1, the second core 240 may decrease the first reference value by a value of '1'. Then, the process may proceed to step S580.

In step S573, the second core 240 may check whether the second reference value is a value of '0' at the moment. The second reference value may indicate the number of times that GC source blocks are erased, i.e., the GCC. The second reference value may be stored in the memory 230. When it is checked that the second reference value is a value of '0' at the moment (S573, Yes), the process may proceed to step S575. On the other hand, when it is checked that the second reference value is not a value of '0' at the moment (S573, No), the process may proceed to step S574.

In step S574, the second core 240 may determine that the GCM has executed normally, and reset the first and second reference values stored in the memory 230. For example, the reset first reference value may be the number of open blocks which can be allocated at the same time, and the reset second reference value may be a value of '0'.

In accordance with the present embodiments, the data storage device and the operating method may prevent excessive consumption of free blocks, which occurs when the GC operation is not normally performed due to a software error. As a result, it is possible to prevent a breakdown of the data storage device due to a shortage of free blocks.

Figure 7:
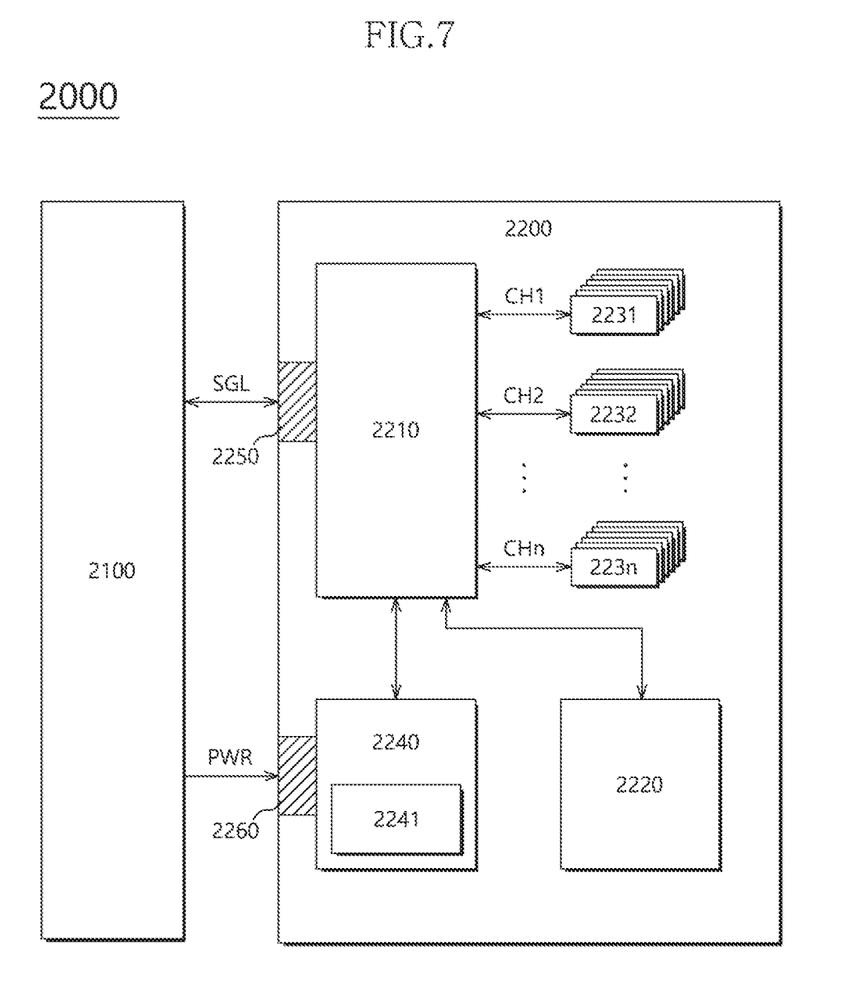
FIG. 7 is a diagram illustrating a data processing system including a solid-state drive (SSD) in accordance with an embodiment.

FIG. 7 illustrates a data processing system 2000 including a solid-state drive (SSD) in accordance with an embodiment. Referring to FIG. 7, the data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, and data. The signal connector 2250 may be configured of various types of connectors according to an interfacing method between the host apparatus 2100 and the SSD 2200.

Figure 8:
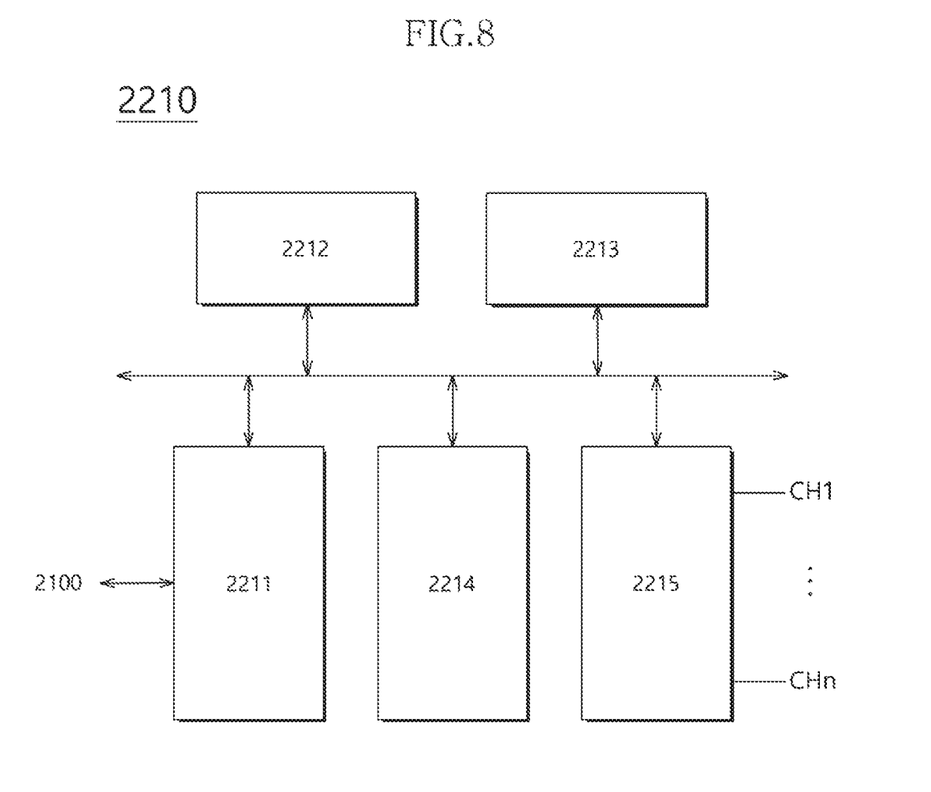
FIG. 8 is a diagram illustrating a controller illustrated in FIG. 7.

FIG. 8 illustrates the controller 2210 of FIG. 7. Referring to FIG. 8, the controller 2210 may include a host interface unit 2211, a control unit 2212, a random-access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through one of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-e or PCIe) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 9:
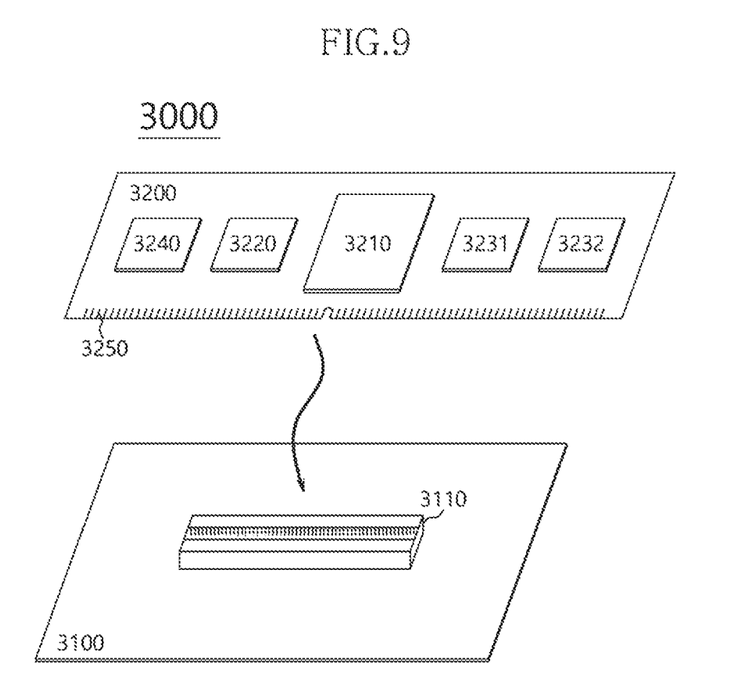
FIG. 9 is a diagram illustrating a data processing system including a data storage device in accordance with an embodiment.

FIG. 9 illustrates a data processing system 3000 including a data storage apparatus in accordance with an embodiment. Referring to FIG. 9, the data processing system 3000 may include a host apparatus 3100 and a data storage device 3200.

The host apparatus 3100 may be configured in a board form such as a printed circuit board (PCB). Although not shown in FIG. 9, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage device 3200 may be configured in a board form such as a PCB. The data storage device 3200 may refer to a memory module or a memory card. The data storage device 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage device 3200. The controller 3210 may be configured to have the same configuration as the controller 2210 illustrated in FIG. 8.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage device 3200.

The PMIC 3240 may provide power input through the connection terminal 3250 to the inside of the data storage device 3200. The PMIC 3240 may manage the power of the data storage device 3200 according to control of the controller 3210.

The connection terminal 3250 may be coupled to the connection terminal 3110 of the host apparatus 3100. A signal such as a command, an address, and data, and power may be transmitted between the host apparatus 3100 and the data storage device 3200 through the connection terminal 3250. The connection terminal 3250 may be configured in various forms according to an interfacing method between the host apparatus 3100 and the data storage device 3200. The connection terminal 3250 may be arranged in any one side of the data storage device 3200.

Figure 10:
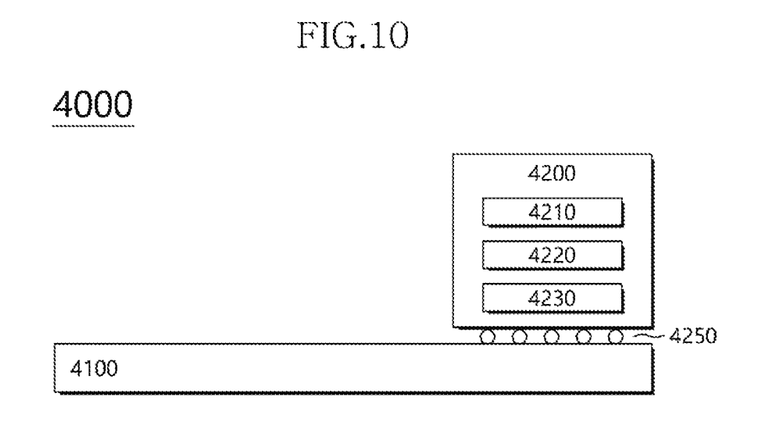
FIG. 10 is a diagram illustrating a data processing system including a data storage device in accordance with an embodiment.

FIG. 10 illustrates a data processing system 4000 including a data storage apparatus in accordance with an embodiment. Referring to FIG. 10, the data processing system 4000 may include a host apparatus 4100 and a data storage device 4200.

The host apparatus 4100 may be configured in a board form such as a PCB. Although not shown in FIG. 10, the host apparatus 4100 may include internal functional blocks configured to perform functions of the host apparatus 4100.

The data storage device 4200 may be configured as a surface mounting packaging form. The data storage device 4200 may be mounted on the host apparatus 4100 through a solder ball 4250. The data storage device 4200 may include a controller 4210, a buffer memory device 4220, and a nonvolatile memory device 4230.

The controller 4210 may control an overall operation of the data storage device 4200. The controller 4210 may be configured to have the same configuration as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage device 4200.

Figure 11:
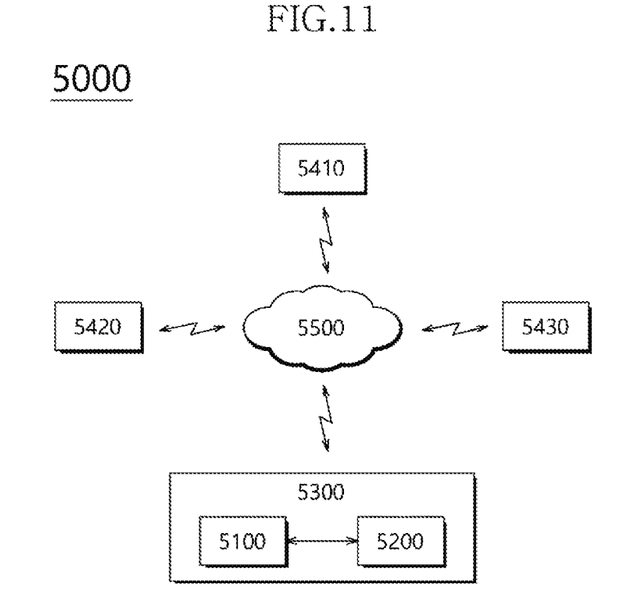
FIG. 11 is a diagram illustrating a network system including a data storage device in accordance with an embodiment.

FIG. 11 illustrates a network system 5000 including a data storage device in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage device 5200. The data storage device 5200 may be configured of the data storage device 10 of FIG. 1, the SSD 2200 of FIG. 7, the data storage device 3200 of FIG. 9, or the data storage device 4200 of FIG. 10.

Figure 12:
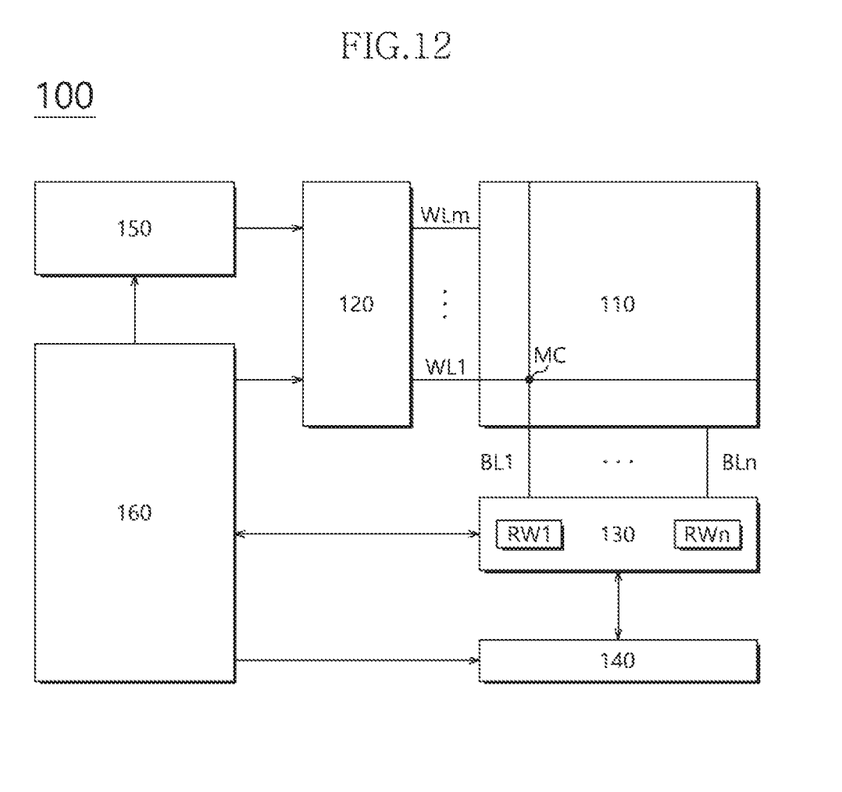
FIG. 12 is a diagram illustrating a nonvolatile memory device in a data storage device in accordance with an embodiment.

FIG. 12 illustrates a nonvolatile memory device 100 included in a data storage device in accordance with an embodiment. Referring to FIG. 12, the nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, and an erase operation of the nonvolatile memory device 100.

While various embodiments have been described above, it will be understood to those skilled in the art that the embodiments described are examples only. Accordingly, the data storage device and the operating method thereof, which have been described herein, should not be limited based on the described embodiments. It will be apparent to those skilled in the art in light of the present disclosure that various changes and modifications may be made without departing from the spirit and scope of the invention as defined in the following claims.

What is claimed is:

1. A data storage device comprising:
a memory device including a plurality of memory blocks having a plurality of free memory blocks; and
a controller configured to control an operation of the memory device,
wherein the controller performs a block allocation operation of allocating one or more free memory blocks among the plurality of free memory blocks as one or more programmable memory blocks,
wherein the controller performs a garbage collection (GC) error defense operation in response to the block allocation operation, and
wherein the GC error defense operation includes:
an operation of determining whether a GC operation of the plurality of memory blocks has been performed successfully based on a maximum number of programmable memory blocks among the plurality of memory blocks and a GC count, and
wherein, the controller waits in an operation suspended state until a reset operation is performed by a host, responsive to a determination that the GC operation has not performed successfully.

2. The data storage device of claim 1, further comprising a memory configured to store the GC count corresponding to a number of memory blocks erased by the GC operation.

3. The data storage device of claim 2, wherein the memory is positioned in the controller.

4. The data storage device of claim 2, wherein the controller stores a GC error defense module in the memory, the GC error defense module indicating a group of source codes performing the GC error defense operation.

5. The data storage device of claim 4, wherein the controller executes the GC error defense module to perform the GC error defense operation, whenever performing the block allocation operation.

6. The data storage device of claim 5, wherein, when the GC error defense module is executed, the controller determines whether a number of the plurality of free memory blocks is less than a threshold number,
wherein, when it is determined that the number of the plurality of free memory blocks is less than the threshold number, the controller checks whether the maximum number of the programmable memory blocks and the GC count are a value of 0,
wherein, when both of the maximum number of the programmable memory blocks and the GC count are a value of 0, the controller determines that the GC operation has not performed successfully.

7. The data storage device of claim 6, wherein, when the number of the plurality of free memory blocks is greater than or equal to the threshold number, the controller resets the maximum number of the programmable memory blocks and the GC count, and then controls the memory device to perform an operation corresponding to a command received from the host.

8. The data storage device of claim 6, wherein, when the maximum number of the programmable memory blocks is not a value of 0, the controller decreases the maximum number of the programmable memory blocks regardless of the GC count, and then controls the memory device to perform an operation corresponding to a command received from the host.

9. The data storage device of claim 6, wherein, when the GC count is not a value of 0, the controller determines that the GC operation has been performed successfully, resets the maximum number of the programmable memory blocks and the GC count, and then controls the memory device to perform an operation corresponding to a command received from the host.

10. The data storage device of claim 6, wherein the controller controls the memory device to store error information indicating that the GC operation has not performed successfully.

11. An operating method of a data storage device which includes a controller and a memory device including a plurality of memory blocks including a plurality of free memory blocks, the operating method comprising:
performing, by the controller, a block allocation operation of allocating one or more free memory blocks among the plurality of free memory blocks as one or more programmable memory blocks; and
performing, by the controller, a garbage collection (GC) error defense operation in response to the block allocation operation,
wherein the GC error defense operation includes:
an operation of determining whether a GC operation of the plurality of memory blocks has been performed successfully based on a maximum number of programmable memory blocks among the plurality of memory blocks and a GC count, and
waiting, by the controller, in an operation suspended state until a reset operation is performed by a host, responsive to a determination that the GC operation has not performed successfully.

12. The operating method of claim 11, wherein the performing the GC error defense operation comprises:
determining, by the controller, whether a number of the plurality of free memory blocks is less than a threshold number;
checking, by the controller, whether the maximum number of the programmable memory blocks is a value of 0, responsive to the number of the plurality of free memory blocks is less than the threshold number;
checking, by the controller, whether the GC count is a value of 0, responsive to the maximum number of the programmable memory blocks is a value of 0;
determining, by the controller, that the GC operation has not performed successfully, responsive to the GC count is a value of 0.

13. The operating method of claim 12, wherein the GC count corresponds to a number of memory blocks erased by the GC operation.

14. The operating method of claim 12, wherein the determining whether the number of the plurality of free memory blocks is less than the threshold number comprises:
resetting the maximum number of programmable memory blocks and the GC count, responsive to the number of the plurality of free memory blocks is greater than or equal to the threshold number; and
controlling the memory device to perform an operation corresponding to a command received from the host.

15. The operating method of claim 12, wherein the checking whether the maximum number of the programmable memory blocks is a value of 0 comprises:
  decreasing the maximum number of the programmable memory blocks regardless of the GC count, responsive to the maximum number of the programmable memory blocks is not a value of 0; and
  controlling the memory device to perform an operation corresponding to a command received from the host.

16. The operating method of claim 12, wherein the checking whether the GC count is a value of 0 comprises:
  determining that the GC operation has been performed successfully, responsive to the GC count is not a value of 0;
  resetting the maximum number of programmable memory blocks and the GC count, responsive to a determination that the GC operation has been performed successfully;
  and controlling the memory device to perform an operation corresponding to a command received from the host.

17. A data storage device comprising:
  a memory device including a plurality of memory blocks; and
  a controller suitable for:
  determining whether a number of free blocks among the plurality of memory blocks is less than a threshold number;
  determining, when it is determined that the number of free blocks among the plurality of memory blocks is less than the threshold number, whether a garbage collection (GC) has been performed successfully, based on a maximum number of programmable memory blocks among the plurality of memory blocks and a garbage collection (GC) count; and
  waiting, when it is determined that the garbage collection has not performed successfully, in an operation suspended state until a reset operation is performed by a host.

* * * * *